US011700145B2

(12) United States Patent
Janssen et al.

(10) Patent No.: US 11,700,145 B2
(45) Date of Patent: Jul. 11, 2023

(54) AUTOMATION NETWORK, NETWORK DISTRIBUTOR AND METHOD FOR TRANSMITTING DATA

(71) Applicant: Beckhoff Automation GmbH, Verl (DE)

(72) Inventors: Dirk Janssen, Verl (DE); Florian Essler, Augsburg (DE); Guido Beckmann, Verl (DE); Hans Beckhoff, Verl (DE); Holger Büttner, Berlin (DE); Martin Rostan, Nuremberg (DE); Thomas Rettig, Rheda-Wiedenbrück (DE)

(73) Assignee: Beckhoff Automation GmbH, Verl (DE)

( * ) Notice: Subject to any disclaimer, the term of this patent is extended or adjusted under 35 U.S.C. 154(b) by 55 days.

(21) Appl. No.: 17/405,709

(22) Filed: Aug. 18, 2021

(65) Prior Publication Data

US 2021/0377069 A1     Dec. 2, 2021

Related U.S. Application Data

(63) Continuation of application No. PCT/EP2020/057448, filed on Mar. 18, 2020.

(30) Foreign Application Priority Data

May 28, 2019 (DE) .................... 10 2019 114 307.1

(51) Int. Cl.
*H04L 12/403* (2006.01)
*H04L 12/40* (2006.01)

(52) U.S. Cl.
CPC ...... *H04L 12/403* (2013.01); *H04L 12/40013* (2013.01); *H04L 12/40182* (2013.01); *H04L 2012/4026* (2013.01)

(58) Field of Classification Search
CPC ............. H04L 12/403; H04L 12/40013; H04L 12/40182; H04L 12/4615; H04L 12/462; H04L 2012/4026; H04L 12/4625
See application file for complete search history.

(56) References Cited

U.S. PATENT DOCUMENTS 6,252,880 B1 *   6/2001   Hanna ................... H04L 49/351
                                                                370/425
9,374,285 B1    6/2016   Ramasubramanian et al.
(Continued)

FOREIGN PATENT DOCUMENTS

CN          101652963 A     2/2010
DE          10004425 A1     1/2002
(Continued)

OTHER PUBLICATIONS

International Preliminary Report on Patentability dated Apr. 8, 2021 in connection with International Patent Application No. PCT/EP2020/057448, 35 pages.
(Continued)

*Primary Examiner* — Min Jung
(74) *Attorney, Agent, or Firm* — Dorsey & Whitney LLP (57) ABSTRACT

An automation network with network subscribers is provided, in which the network subscribers are interconnected via a data line network. At least one network subscriber is configured as a master subscriber, which is adapted to send telegrams via the data line network. At least one network subscriber is configured as a network distributor, which is adapted to route telegrams. The network distributor has a plurality of input/output ports, and is connected to the master subscriber via a first input/output and data line network. The master subscriber is configured to use a telegram element to indicate that the telegram is enabled for processing by the
(Continued)

network subscribers. In addition, the network distributor is configured to process a telegram received via the first input/output port when the telegram element indicates enablement of processing of the telegram by the network subscribers.

20 Claims, 2 Drawing Sheets

(56) References Cited

U.S. PATENT DOCUMENTS

| | | | |
|---|---|---|---|
| 2010/0110884 A1 | 5/2010 | Kulkarni et al. | |
| 2011/0060504 A1* | 3/2011 | Filla | E02F 9/2292 |
| | | | 701/41 |
| 2011/0310894 A1 | 12/2011 | Karino | |
| 2015/0365252 A1* | 12/2015 | Bunte | H04L 12/6418 |
| | | | 709/208 |
| 2021/0072719 A1* | 3/2021 | Zang | G06F 9/44505 |
| 2021/0135900 A1* | 5/2021 | Janssen | H04L 12/40 |
| 2021/0218584 A1* | 7/2021 | Janssen | H04L 12/12 |
| 2021/0359877 A1* | 11/2021 | Janssen | H04L 45/04 |

FOREIGN PATENT DOCUMENTS

| | | |
|---|---|---|
| DE | 102014108457 B3 | 1/2016 |
| DE | 102019114307 A1 | 12/2020 |
| EP | 3932019 B1 | 8/2022 |
| WO | 2013070284 A1 | 5/2013 |
| WO | 2020239286 A1 | 12/2020 |

OTHER PUBLICATIONS

International Search Report and Written Opinion dated Jun. 23, 2020 in connection with International Patent Application No. PCT/EP2020/057448, 23 pages.
"EtherCAT—the Ethernet Fieldbus," EtherCAT Technology Group, Nov. 2012, 21 pages.
"EtherCAT", Wikpedia, Feb. 17, 2023, obtained from <https://en.wikipedia.org/w/index.php?title=EtherCAT&oldid=1139873471 >.
"Network packet", Wikipedia, Mar. 4, 2023, obtained from <https://en.wikipedia.org/w/index.php?title=Network_packet&oldid=1127524370>.
"EtherCAT", Wikpedia, Apr. 9, 2019, obtained Feb. 24, 2023 from <https://de.wikipedia.org/w/index.php?title=EtherCAT&oldid=187408596> with English translation.
"Datenpaket", Wikpedia, obtained Feb. 24, 2023 from <https://de.wikipedia.org/wiki/Datenpaket> with English translation.

* cited by examiner

AUTOMATION NETWORK, NETWORK DISTRIBUTOR AND METHOD FOR TRANSMITTING DATA

CROSS-REFERENCE TO RELATED APPLICATIONS

This present patent application is a continuation of International Application PCT/EP2020/057448, filed Mar. 18, 2020, entitled AUTOMATION NETWORK, NETWORK DISTRIBUTER AND METHOD FOR DATA TRANSMISSION, which claims priority to German patent application DE 10 2019 114 307.1, filed May 28, 2019, entitled AUTOMATISIERUNGSNETZWERK, NETZWERKVERTEILER UND VERFAHREN ZUR DATENÜBERTRAGUNG, each of which is incorporated by reference herein, in the entirety and for all purposes.

FIELD

The present invention relates to an automation network comprising a plurality of network subscribers. The invention further relates to at least one network subscriber in the automation network, which is configured as a network distributor. Furthermore, the invention relates to a method for transmitting data in the automation network, wherein the network distributor is configured to execute the method for transmitting data.

BACKGROUND

Automation networks are often operated as "field-bus systems." These are industrial bus systems that enable real-time capable control of the machines or plants of the automation network, wherein the machines or plants of the automation network are controlled by programmable logic controllers (PLCs). The PLC uses the field-bus system for the communication of the field devices, e.g. sensors and actuators of the machines or plants of the automation network with the PLC. If a plurality of network subscribers send telegrams via the same data line in the automation network, which may be embodied as a wired or wireless bus system, there must be a way for the network subscribers to share the same data line for data transmission. For this purpose, defined hierarchies and standardized data transmission protocols are provided.

In most cases, the field-bus systems operate in what is referred to as the "master-slave mode." This means that at least one network subscriber is embodied as a master subscriber and takes over the control of the processes, while the other network subscribers take over the processing of subtasks in the control mode of the automation network as slave subscribers. Data is exchanged in the automation network by telegrams that are outputted by the master subscriber to the slave subscribers. The slave subscribers read the output data addressed to them from the telegram, insert their input data into the telegram, and send the telegram back to the master subscriber.

In automation networks in which data traffic is carried out by telegrams with an underlying EtherCAT data transfer protocol, hereinafter referred to as EtherCAT networks, the telegrams are routed through all slave subscribers and, in the case of a chain of slave subscribers connected to a data line, are returned to the master subscriber by the last slave subscriber. In this context, routing refers to the definition of transmission paths for transmitting telegrams in the automation network. The disadvantage of such an EtherCAT network is the fact that the telegrams are always passed through and processed by all slave subscribers, i.e. each slave subscriber reads the output data of the telegram addressed to it while passing through ("on the fly") and places its input data in the telegram before the slave subscriber forwards the telegram. Sending a telegram from a slave subscriber in an EtherCAT network corresponds to entering information into the telegram sent by the master network subscriber and forwarding the telegram to a slave subscriber following in the direction of telegram flow, since a slave subscriber in an EtherCAT network does not itself send any response telegrams to requests from the master subscriber.

Frequently, network distributors referred to as "switches" are used in automation networks to interconnect the individual data lines with the connected network subscribers and to ensure that the data or telegrams reach their destination via the network subscribers connected to the individual input/output ports of the network distributors via the data line network. In addition, the network distributors may also be embodied as so-called "manageable switches," i.e. in addition to the basic functions such as "store-and-forward," i.e. the complete receipt of a telegram, the calculation of a checksum for the telegram and a subsequent routing of the telegram, they may also have control and monitoring functions. However, even the use of a manageable switch in an automation network does not open up the additional function of processing a telegram as a slave subscriber. A manageable switch is not embodied as a conventional slave subscriber, either, but is used for routing telegrams instead of processing them independently. Accordingly, there is no network distributor which, in addition to the routing functionality or the additional control and monitoring functions, also has the function of a slave subscriber, i.e., for example, the processing of subtasks in the control operation of the automation network.

SUMMARY

The present invention provides an improved network distributor that enables optimized resource utilization and increases the throughput during data transmission. Furthermore, the present invention provides an improved automation network.

EXAMPLES

According to an aspect, an automation network is provided. The automation network comprises network subscribers, which are connected to one another via a data line network. Thereby, at least one network subscriber is embodied as a as a master subscriber configured to send telegrams over the data line network. At least one network subscriber is configured as a network distributor configured to route telegrams. The network distributor comprises a plurality of input/output ports and is connected to the master subscriber via a first input/output port, via the data line network. The master subscriber is embodied to indicate with a telegram element in the telegram to be sent that the telegram is enabled for processing by the network subscribers. The network distributor is embodied to process a telegram received via the first input/output port when the telegram element of the telegram indicates an enablement of processing of the telegram for the network subscribers.

The term "connected" is used herein to mean that further network subscribers may be connected via the data line network between the master subscriber and the network distributor.

According to a further aspect, a network distributor is provided. The network distributor comprises a plurality of input/output ports and a processing unit for processing and/or routing a telegram. The network distributor is embodied to be connected to a master subscriber via a first input/output port over a data line network. The processing unit of the network distributor is embodied to process a telegram received via the first input/output port of the network distributor from the master subscriber if the master subscriber indicates by a telegram element in the telegram that the telegram is enabled for processing by the processing unit of the network distributor.

According to another aspect, a method for transmitting data in an automation network is provided. The automation network comprises network subscribers, wherein at least one network subscriber is embodied as a master subscriber, configured to send telegrams. At least one network subscriber is configured as a network distributor configured to route telegrams. With a telegram element in a telegram to be sent, it is indicated that the telegram is enabled for processing by the network subscribers. The network distributor is embodied to process a telegram received via a first input/output port when the telegram element of the telegram indicates an enablement of processing of the telegram for the network subscribers.

A network distributor, a "switch" or "branch" is to be provided as a device with dual functionality. On the one hand, the network distributor operates as a configurable network distributor and provides all the advantages of a network distributor: manageable switch with control function, store-and-forward operation, routing of telegrams, etc., as well as the possibility of fragmenting telegrams and fragmented transmission of telegrams in the automation network.

Moreover, the network distributor additionally combines a conventional network or slave subscriber, which is able to process telegrams from a master subscriber, in one device. The master subscriber may render the release of processing or the blocking of processing "visible" to the network distributor with dual functionality by a suitable display in the telegrams, so that the network distributor processes and/or routes a telegram depending on the display. The network distributor may thus be used flexibly in the automation network, and may contribute to the reduction of network components in the automation network due to its dual functionality. The network distributor is also compatible with existing automation networks and may be integrated into them without effort.

According to an embodiment, the processing unit of the network distributor is connected to the first input/output port of the network distributor. The processing unit of the network distributor is further embodied, if the network distributor receives a telegram from the master subscriber via the first input/output port, which telegram indicates with a telegram element a release of the processing of the telegram for the network subscribers, to output the telegram after processing by the network distributor via a permanently allocated further input/output port of the network distributor, if further network subscribers are connected to the permanently allocated further input/output port of the network distributor.

The permanently allocated further input/output port of the network distributor is the input/output port of the network distributor via which the processing unit advantageously does not need to route. This is because, due to the setting, i.e. the definition of the further input/output port of the network distributor as the standard input/output port via which a telegram is output after processing by the processing unit, no matching is required by the processing unit with a routing table used for an allocation of the input/output ports of the network distributor to the telegrams. If no further network subscribers are connected to the permanently allocated further input/output port via the data line network, the network distributor may be the last network subscriber in a chain of network subscribers and send the telegram from the master subscriber back to the master subscriber via the chain. In this case, the other input/output port of the network distributor may be short-circuited by a switch function.

According to a further embodiment, the processing unit of the network distributor is embodied to release a telegram for processing by the network subscribers and to indicate the release of the processing with the telegram element if a telegram does not indicate a release of the processing of the telegram by the network subscribers, and the network distributor determines by the processing unit when routing the telegram that the telegram is intended for network subscribers that are directly connected via an input/output port of the network distributor.

Advantageously, the network distributor may be embodied to selectively release telegrams for processing and, by selectively releasing the telegrams, increase confidentiality during data transmission in the automation network. Conversely, the network distributor may also block a telegram for processing if the network distributor receives a telegram released for processing from a preceding network distributor in the automation network that is not intended for any network subscriber connected directly via an input/output port of the network distributor. In this way, too, confidentiality may be increased during data transmission with the aid of the proposed network distributor.

In a further embodiment, the telegrams have a telegram identifier. The processing unit of the network distributor comprises a protocol chip for processing the telegrams and comprises a routing unit for routing the telegrams via the input/output ports of the network distributor, on the basis of the telegram identifier of the telegrams.

By using the telegram identifier, which in an EtherCAT network may be implemented as a segment address, for example, simple routing and a unique allocation of the telegram identifier of a telegram to an input/output port of the network distributor is advantageously possible. With the processing unit, the network distributor is not limited to a specific data transmission protocol, since the protocol chip may e.g. be embodied to process a plurality of data transmission protocols.

According to a further embodiment, the protocol chip of the processing unit of the network distributor is embodied as an EtherCAT slave controller. In an EtherCAT network, the protocol chip of the network distributor is preferably embodied as an EtherCAT slave controller in order to be able to use the proven real-time capable EtherCAT technology and to embody the network distributor in the dual functionality as an EtherCAT slave subscriber.

In a further embodiment, the routing unit of the processing unit of the network distributor is embodied to compare the telegram identifier of the telegrams in each case with a routing table and to output the telegrams via the input/output port of the network distributor allocated to the telegram identifier. The routing unit of the processing unit of the network distributor is embodied to release a telegram for processing by the network subscribers and to indicate the release for the network subscribers in the telegram with the telegram element.

The entries in the routing table that are relevant for routing are advantageously limited to the allocation of the telegram identifier to an input/output port of the network distributor. Thus, memory space may be saved due to the efficient use of information in the routing table. This may advantageously contribute to reducing costs.

According to a further embodiment, the telegram element is embodied as a data element with a first or second value. The first value indicates that a telegram is enabled for processing by the network subscribers, and the second value indicates that a telegram is blocked for processing by the network subscribers.

Preferably, the telegram element of a telegram is located in the header section of the telegram so that the network subscribers may early on detect a release of the telegram for processing or a blocking of the telegram for processing and may begin processing or forwarding to the next network subscriber without delay. In this way, the throughput during data transmission may advantageously be increased. Furthermore, the telegram element may be used variably for different data transmission protocols and is e.g. not limited to the real-time capable EtherCAT data transmission protocol.

In a further embodiment, the telegrams are implemented as EtherCAT telegrams and the network distributor is embodied to process the EtherCAT telegrams.

Here the telegram element advantageously is embodied as an EtherCAT protocol type. Due to the design of the protocol chip as an EtherCAT slave controller, the network distributor becomes an ordinary EtherCAT slave subscriber that may process the EtherCAT telegrams. In this case an enabling as well as a disabling of the processing of the telegram may be indicated by the EtherCAT protocol type, which e.g. may comprise two values, wherein the first value by default indicates the enable of the processing with the value 0x1 (in hexadecimal system), i.e. the EtherCAT slave controller knows in that case that it is addressed and starts processing the telegram, and the second value may e.g. indicate to the EtherCAT slave controller the blocking of the processing of the telegram in the form of the value 0x6 (in hexadecimal system). The network distributor may be easily integrated into existing automation networks, since the network distributor is based on the proven EtherCAT technology and is compatible with existing EtherCAT networks.

The advantageous embodiments and further developments of the invention explained above and/or indicated in the sub-claims may be used individually or in any combination with one another—except e.g. in cases of clear dependencies or incompatible alternatives.

BRIEF DESCRIPTION OF THE DRAWINGS

The above-described features, characteristics and advantages of the present invention as well as the manner in which they are achieved will become clearer and more easily understood in connection with the following description of embodiments, which will be explained in more detail in connection with the schematic drawings, in which.

DETAILED DESCRIPTION

It should be noted that the figures are merely schematic in nature and not to scale. In this context, components and elements shown in the figures may be exaggeratedly large or reduced in size for better understanding. Furthermore, it is pointed out that the reference signs in the figures remain unchanged if the elements and/or components have the same embodiment.

Automation networks are usually implemented as fieldbus systems in which the network subscribers are networked with one another via the field bus. The network subscribers may be embodied as at least one master subscriber, as at least one network distributor and as several network subscribers or slave subscribers, respectively. The aforementioned network subscribers may be embodied to exchange data with control units, wherein real-time capable data transfer protocols such as the EtherCAT data transfer protocol are generally used for this purpose. In addition, the automation network may also have network subscribers that may process other data transfer protocols such as TCP/IP (TCP/IP: Transmission Control Protocol/Internet Protocol), Ethernet, etc. These network subscribers do not have to be addressed for control tasks. For example, these data transmission protocol data may include diagnostic information about the automation network. The automation network, the network distributor and the proposed method for data transmission are explained below by way of example using the real-time capable EtherCAT data transmission protocol.

The above-mentioned network subscribers connected via the data line network in the automation network may be interconnected via network distributors, so-called "switches" or "branches." The network distributors furthermore serve to coordinate the data exchange of the subscribers in the segments and to route the telegrams to their destination in good time. A network distributor which, in addition to its function of routing telegrams via the individual input/output ports of the network distributor, also functions as an ordinary network or slave subscriber has not yet been realized.

Accordingly, the core idea of the proposed automation network is a device network distributor, which has the function of routing the telegrams in order to combine network or slave subscribers with one another, which is able to process telegrams from the master subscriber as a network or slave subscriber. The proposed network distributor has dual functionality and may process and/or route telegrams with a suitable indication in the telegrams. The proposed automation network and network distributor as well as the proposed method for data transmission are thereby not limited to the use of the EtherCAT data transmission protocol, even though this is the preferred data transmission protocol, but may be used in all automation networks in which telegrams are to be routed and additionally processed.

The structure and functionality of the automation network and the network distributor are described below on the basis of FIGS. 1 and 2, with the associated reference signs from both figures being used in the description where useful.

Figure 1:
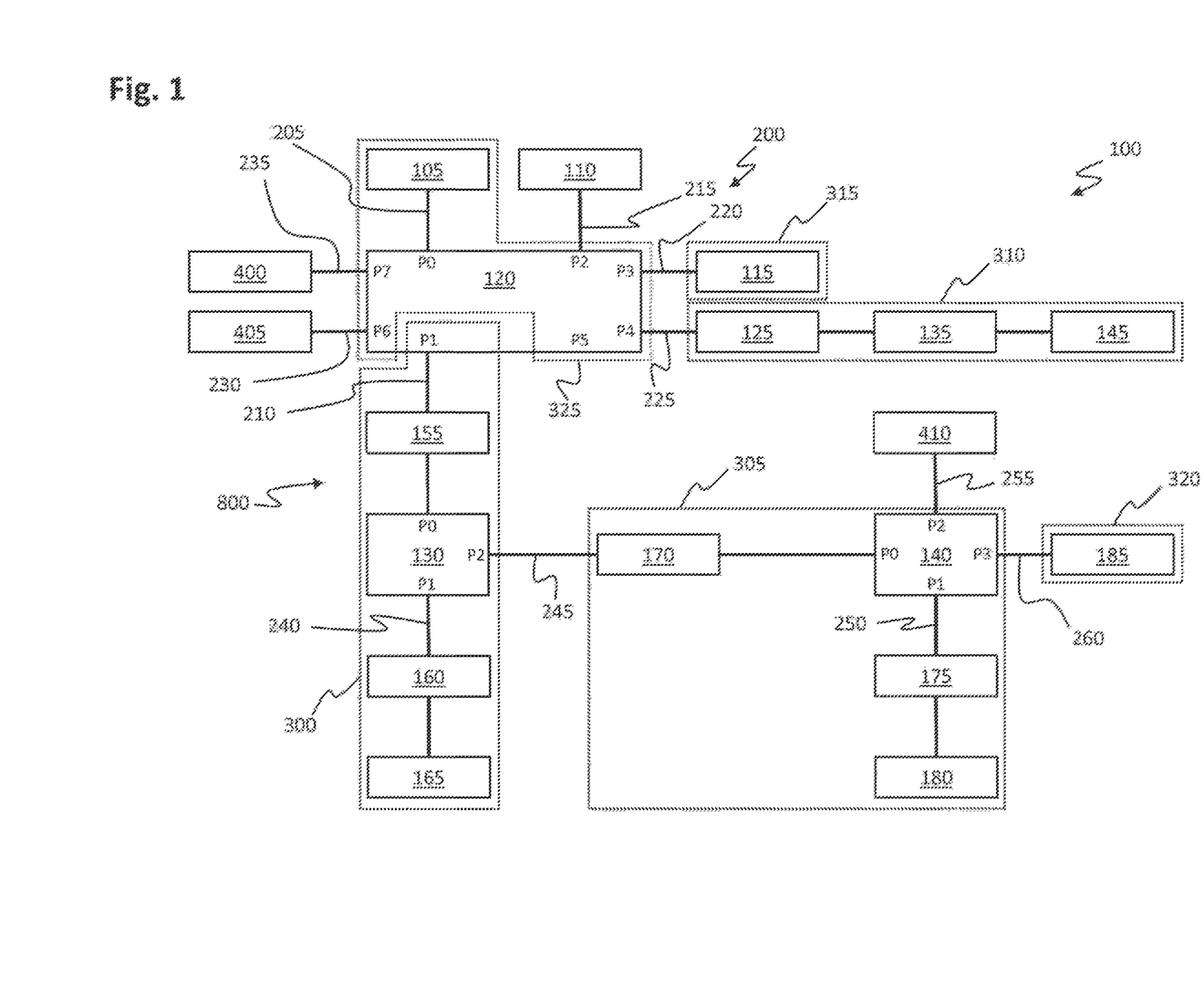
FIG. 1 shows a schematic structure of an automation network having network distributors embodied to perform a method for transmitting data.

FIG. 1 shows a schematic structure of an automation network 100 comprising network subscribers embodied for a data transmission method. The automation network 100 comprises network subscribers 800, which are interconnected via a data line network 200. At least one network subscriber 800 of the automation network 100 is configured as a master subscriber 105, and at least one network subscriber 800 is configured as a network distributor. The master subscriber 105 is connected to a first input/output port P0 of a first network distributor 120 via a first data line 205 and may form a sixth segment 325. The first network distributor 120 may be connected to another master subscriber 110 via a third input/output port P2 via a third data line 215. In this regard, e.g. only the master subscriber 105 connected to the first input/output port P0 of the first network distributor 120 via the first data line 205 may be configured to perform a central configuration of the automation network 100 with its network distributors and network subscribers 800.

A fourth input/output port P3 of the first network distributor 120 and a fourth data line 220 may connect the first network distributor 120 to a fourth segment 315 of the automation network 100. For example, the fourth segment 315 may include a first network subscriber 115. For clarity, only the input/output ports of the network distributors are shown in FIG. 1. Nevertheless, the other subscribers in the automation network 100 have input/output ports through which the subscribers are interconnected via the data line network 200. This aspect will not be discussed further in the following. In this context, the first network subscriber 115 may e.g. be an EK1100 coupling element manufactured by Beckhoff Automation GmbH & Co. KG, and may be embodied to enable data communication at a first data transmission rate of 100 Mbit/s or a first symbol rate of 100 Mbaud and to process telegrams of the master subscriber 105. Accordingly, the first network subscriber 115 may exemplarily be embodied as a slave subscriber. The fourth segment 315 may be configured as described. Furthermore, it is conceivable that the fourth segment 315 deviates from the described embodiment and comprises further network subscribers 800 or slave subscribers, respectively.

The first network distributor 120 may be connected to a third segment 310 of the automation network 100 via a fifth input/output port P4 of the first network distributor 120 and a fifth data line 225. The third segment 310 may include a second network subscriber 125, a third network subscriber 135, and a fourth network subscriber 145, wherein the second to fourth network subscribers 125, 135, 145 may each be embodied as slave subscribers for processing telegrams from the master subscriber 105. The second network subscriber 125 may e.g. be configured as a coupling element. The third network subscriber 135 may be e.g. embodied as a simple branch, wherein the simple branch may be embodied to have routing functionality in addition to the protocol used in the method for data transmission and to support further protocols, such as the TCP/IP protocol (Transmission Control Protocol/Internet Protocol).

The fourth network subscriber 145 may e.g. also be configured as a simple branch. The first to fourth network subscribers 125, 135, 145 in the third segment 310 may likewise be embodied to implement data communication at a second data transmission rate of 1 Gbit/s or at a second symbol rate of 1 GBaud, respectively. Thus, for example, unlike the fourth segment 315, the third segment 310 may operate at the second data transmission rate of 1 Gbit/s instead of the first data transmission rate of 100 Mbit/s. The first and second data transfer rates mentioned above, as well as data transfer rates mentioned below, may also be implemented with values deviating from the above-described ones, such as the second data transfer rate with 2.5 Gbit/s or 5 Gbit/s or 10 Gbit/s, and so on.

For example, a sixth input/output port P5 of the first network distributor 120 may not have a data line connected to one or more network subscribers. Here, the sixth input/output port P5 has been selected by way of example. It is further conceivable that another input/output port of the first network distributor 120 is configured in such a way or that network subscribers are connected to the sixth input/output port P5 of the first network distributor 120 and the sixth input/output port P5 is designated as an end port with an associated port address.

A seventh input/output port P6 and a sixth data line 230 connect the first network distributor 120 to a thirteenth network subscriber 405. Thereby, the thirteenth network subscriber 405 may not be embodied as a network subscriber processing the EtherCAT data transfer protocol, but as an Ethernet subscriber, wherein it may be characteristic of the Ethernet subscriber to process only telegrams with underlying Ethernet data transfer protocol. In this context, it is conceivable that the thirteenth network subscriber 405 does not form an independent segment in the automation network. For example, the thirteenth network subscriber 405 is embodied to implement data communication at the second data transmission rate of 1 Gbit/s.

An eighth input/output port P7 and a seventh data line 235 may connect the first network distributor 120 to a twelfth network subscriber 400. The twelfth network subscriber 400 may also be configured to process the Ethernet data transmission protocol and may represent an Ethernet subscriber. For example, the Ethernet subscriber may be configured to implement the data communication at the first data transmission rate of 100 Mbit/s. Similarly to the thirteenth network subscriber 405, the twelfth network subscriber 400 may not form an independent segment in the automation network 100.

The first network distributor 120 may be part of the sixth segment 325. The first network distributor 120 may be connected to a fifth network subscriber 155 via a second input/output port P1 and a second data line 210. The fifth network subscriber 155 may be configured for data transmission at the second data rate. The fifth network subscriber 155 may be connected to a first input/output port P0 of a second network distributor 130 via the second data line 210, and may be configured as a slave subscriber for processing telegrams from the master subscriber 105.

The second network distributor 130 may be connected to a sixth network subscriber 160 via a second input/output port P1 of the second network distributor 130 and via an eighth data line 240. For example, the sixth network subscriber 160 may also be formed as a simple branch above and may process telegrams from the master subscriber 105. Furthermore, the sixth network subscriber 160 may subsequently comprise a seventh network subscriber 165 on the eighth data line 240. The seventh network subscriber 165 may form the last network subscriber in a first segment 300 extending from the second input/output port P1 of the first network distributor 120 to the seventh network subscriber 165, as the network subscribers 800 in the individual segments are generally arranged in a chain. Furthermore, the seventh network subscriber 165 may be configured as a coupling element and may be suitable for processing telegrams from the master subscriber 105. For example, the second network distributor 130 may be part of the first segment 300, provided that the second input/output port P1 of the second network subscriber 130 is set up for this purpose.

The first segment 300, starting with the second input/output port P1 of the first network distributor 120, the fifth network subscriber 155, the second network distributor 130, the sixth slave subscriber 160, and the seventh network subscriber 165 may be embodied for data communication at the second data transmission rate with 1 Gbit/s, since the fifth network subscriber 155, the sixth network subscriber 160, and the seventh network subscriber 165 are e.g. embodied in such a way. However, it is also conceivable that the fifth network subscriber 155, the sixth network subscriber 160 and the seventh network subscriber 165 are equally capable of implementing both the second data transmission rate at 1 Gbit/s and the first data transmission rate at 100 Mbit/s, as are the first network distributor 120 and the second network distributor 130. In this regard, the first segment 300 may include additional network subscribers that are embodied to implement the first data transmission rate. In the case described, the data transmission rate for the subscribers of the first segment 300 may be set uniformly to the first data transmission rate. This likewise applies to the other segments, which may also have further network subscribers that are embodied to implement only the first data transmission rate. However, this property is not referred to again for the description of the other segments.

The second network distributor 130 is connected to an eighth network subscriber 170 via a third input/output port P2 and a ninth data line 245. The eighth network subscriber 170 e.g. forms the first network subscriber in a second segment 305, and may be provided for processing telegrams from the master subscriber 105. The eighth network subscriber 170 may e.g. be arranged for data communication at the second data transmission rate. The eighth network subscriber 170 is further connected to a first input/output port P0 of a third network distributor 140 via the eighth data line 240. The third network distributor 140 may be part of the second segment 305. A third input/output port P2 and an eleventh data line 255 may connect the third network distributor 140 to a fourteenth network subscriber 410. For example, the fourteenth network subscriber 410 is configured as an Ethernet switch that processes the Ethernet data transmission protocol. In the automation network 100, it may be provided for the fourteenth network subscriber 410 in the same way as for the twelfth and thirteenth network subscribers 400, 405 not to form an independent segment of the automation network 100, since, for example, only network subscribers that process the EtherCAT data transmission protocol are provided for this.

The third network distributor 140 may be connected to an eleventh network subscriber 185 of a fifth segment 320 of the automation network 100 via a fourth input/output port P3 and a twelfth data line 260. For example, the eleventh network subscriber 185 may be configured to implement the first data transmission rate and process telegrams from the master subscriber 105. The third network distributor 140 may be connected to a ninth network subscriber 175 via a second input/output port P1 and a tenth data line 250. The ninth network subscriber 175 may be part of the second segment 305 and embodied as a coupling element to process telegrams from the master subscriber 105. The ninth network subscriber 175 may be configured to implement the second data transmission rate. Downstream of the ninth network subscriber 175, a tenth network subscriber 180 may be connected to the tenth data line 250 and may also be configured as a slave subscriber to process telegrams from the master subscriber 105. The tenth network subscriber 180 may, for example, form the last network subscriber of the network subscribers arranged in a chain in the second segment 305.

The master subscriber 105 may be embodied to indicate by a telegram element in the respective telegram to be sent that the respective telegram is released for processing by the network subscribers, hereinafter referred to as an unblocked telegram. This means that the first to third network distributors 120, 130, 140 may process telegrams for which the master subscriber 105 indicates the release of processing by the telegram element. In this context, the first to third network distributors 120, 130, 140 may be embodied to output the telegrams after processing by the network distributors each via a permanently allocated further input/output port, e.g. the second input/output port P1, if further network subscribers 800 are connected to the permanently allocated second input/output port P1 of the first to third network distributors 120, 130, 140. The permanently allocated further input/output port may also be any further third to eighth input/output ports P2 to P7 of the first to third network distributors 120, 130, 140. The term "permanently allocated second input/output port P1" means a second input/output port P1 of the corresponding network distributor, via which the corresponding network distributor does not route the respective telegram via the second input/output port P1 of the corresponding network distributor, if the telegram is unblocked.

The master subscriber 105 may indicate the release of the processing of a telegram to the network subscribers by the above-mentioned telegram element. Furthermore, the master subscriber 105 may be embodied to indicate the blocking of the processing of a telegram by the network subscribers by the telegram element, as well, but in a different manner to indicate the release of the processing of a telegram. For example, if the telegram element is in the form of a data element having a first value or a second value, the master subscriber 105 may indicate a release of processing of the telegram by the network subscribers using the first value of the data element. With the second value of the data element, the master subscriber 105 may e.g. indicate a blocking of the processing of the telegram to the network subscribers and to the first to third network distributors 120, 130, 140, for example.

If the telegrams are formed as EtherCAT telegrams, the telegram element may in particular be embodied in the form of an EtherCAT protocol type, wherein the master subscriber 105 indicates a release of the processing of the respective telegram by the network subscribers by a first value of the EtherCAT protocol type in the respective telegram, for example by the value 0x1 (in the hexadecimal system). The network subscribers as well as the network distributors in the corresponding EtherCAT segment recognize by this value that the EtherCAT telegram is released for processing and start processing datagrams in the EtherCAT telegram. The EtherCAT protocol type has a second value, which is different from the first value with 0x1 (in hexadecimal system), e.g. the second value may correspond to the value 0x6 (in hexadecimal system), if the EtherCAT telegram is blocked for processing by the network subscribers, incl. the network distributors, in the respective EtherCAT segment, hereinafter referred to as blocked telegram.

It is also conceivable that the master subscriber 105 indicates that processing of a telegram is enabled for the network subscribers by adding the telegram element, while a telegram that is e.g. not enabled for processing, has no telegram element.

The automation network 100 shown in FIG. 1 may be embodied as an EtherCAT network and the data transmission between the master subscriber 105 and the individual network subscribers may be performed by the real-time capable EtherCAT data transmission protocol. In this context, the segments shown in FIG. 1 represent EtherCAT segments, wherein the twelfth to fourteenth network subscribers 400, 405, 410 each do not form an EtherCAT segment, since the twelfth to fourteenth network subscribers 400, 405, 410 are e.g. not embodied to process the EtherCAT data transmission protocol.

The master subscriber 105 may be embodied to send a configuration telegram to the first network distributor 120 via the first data line 205 to assign telegram identifiers of the telegrams from the master subscriber 105 to the individual input/output ports of the first network distributor 120, via which the first network distributor 120 outputs the telegrams. For example, the master subscriber 105 may identify the individual telegrams with a telegram identifier, wherein the telegram identifier in an EtherCAT network may e.g. be realized as a segment address, since the telegrams from the master subscriber 105 pass through by all network subscribers in an EtherCAT segment. In an automation network 100 that is not embodied as an EtherCAT network and the data transmission is performed with a data transmission protocol that differs from the EtherCAT data transmission protocol, the telegram identifier may be embodied as a port address, a VLAN address (VLAN: Virtual Local Area Network), a MAC address (MAC: Media Access Control), in the form of a symbol or value, or deviating therefrom.

The allocation of the telegram identifier of a telegram to the corresponding input/output port of the first network distributor 120, via which the first network distributor 120 outputs the respective telegram to the network subscribers of a segment, may e.g. be stored in a routing table in a memory unit of the first network distributor 120. It is also conceivable that the allocation of the individual input/output ports of the first network distributor 120 to the respective telegram identifiers of the telegrams is already stored in the memory unit of the first network distributor 120. At the same time, the master subscriber 105 may use the configuration telegram to carry out a setting of the first network distributor 120, e.g. how the first network distributor 120 is to proceed if the first network distributor 120 receives a blocked telegram with a telegram identifier via the first input/output port P0.

Also, the master subscriber 105 may use the configuration telegram in the first network distributor 120 to set the first network distributor 120 to output a telegram with a telegram identifier by which no segment directly connected to the first network distributor 120 is addressable with network subscribers, via the second input/output port P1 of the first network distributor 120, and allocates the second input/output port P1 to the telegram having the telegram identifier in the routing table, provided that the telegram having the telegram identifier indicates a blocking of processing for the first network distributor 120 by the telegram element. The master subscriber 105 may send the configuration telegram for setting purposes prior to the actual telegram traffic in the control mode of the automation network 100.

If the master subscriber 105 sends a blocked telegram having a telegram identifier to the first network distributor 120 via the first data line 205, the first network distributor 120 uses the telegram identifier when receiving the blocked telegram to check which of the input/output ports of the first network distributor 120 stored in the routing table of the first network distributor 120 is allocated to the respective telegram with the telegram identifier. In other words, the first network distributor 120 may use the respective telegram identifier of a telegram to perform routing of the telegram via the individual input/output ports of the first network distributor 120. If the telegram identifier of the telegram sent by the master subscriber 105 is e.g. realized in the form of a segment address that may be allocated to the first segment 300, the first network distributor 120 can, on the basis of the setting carried out with the configuration telegram, assign the first segment 300 addressable with the telegram identifier to the second input/output port P1 of the first network distributor 120.

Various embodiments are conceivable for structuring the automation network 100 into segments that are embodied as EtherCAT segments in an EtherCAT network. For example, an EtherCAT segment may start at an input/output port of a network distributor, which is embodied as a network distributor, via which only network subscribers are connected. For example, such an EtherCAT segment may extend over the second network subscriber 125, the third network subscriber 135 and the fourth network subscriber 145 and comprise the third segment 310.

Furthermore, an EtherCAT segment may start at an input/output port of a network distributor configured as a network distributor, via which network subscribers as well as further network distributors that may be configured as network subscribers are connected, wherein a further input/output port can then be set up for this at the further network distributor configured as a network subscriber. For example, an EtherCAT segment configured in this way may comprise the fifth network subscriber 155, the second network distributor 130 (provided that the second input/output port P1 of the second network distributor 130 is set accordingly), the sixth network subscriber 160 and the seventh network subscriber 165, i.e. correspond to the first segment 300. Moreover, an EtherCAT segment may start at the master subscriber 105 and end at the next network distributor. For example, the EtherCAT segment may comprise the master subscriber 105 and the first network distributor 120 and be implemented in the form of the sixth segment 325.

Before the first network distributor 120 outputs the blocked telegram with the telegram identifier in the form of the segment address of the first segment 300, which may comprise the symbol a, e.g. via the second input/output port P1 of the first network distributor 120, it may have been set with the configuration telegram that the first network distributor 120 sets the second value of the data element of the telegram to the first value, in order to indicate to the network subscribers in the first segment 300 that processing of the telegram is enabled.

Also, it may have been set with the configuration telegram in the first network distributor 120 that the first network distributor 120 sets the second value of the EtherCAT protocol type to the first value of the EtherCAT protocol type, according to the above description. Here, the term "set" may be understood in the sense of overwriting the values. Moreover, it is conceivable that the first network distributor 120 has already unblocked the blocked telegram after receiving the blocked telegram via the first input/output port P0 of the first network distributor 120. For example, the fifth network subscriber 155 may read the output data of the unblocked telegram addressed to it with the telegram identifier a of the first segment 300 when passing through and place its input data in the unblocked telegram, which is forwarded by the fifth network subscriber 155 to the second network distributor 130 via the second data line 210 and received by the second network distributor 130 on the first input/output port P0. The above explanations for setting the first network distributor 120 apply analogously to the second and third network distributors 130, 140.

After the second network distributor 130 has read the output data of the unblocked telegram addressed to it with the telegram identifier in the form of the segment address a of the first segment 300 "on the fly" and has placed its input data in the unblocked telegram, the second network distributor 130 may forward the unblocked telegram to the sixth network subscriber 160 via the set second input/output port P1 over the eighth data line 240. This assumes that the second input/output port P1 of the second network distributor 130 is appropriately set by the master subscriber 105, so that the second network distributor 130 may process the unblocked telegram with the telegram identifier in the form of the segment address a of the first segment 300 and the telegram element indicating to the second network distributor 130 that processing of the telegram is enabled, as a network subscriber. The master subscriber 105 may define the second input/output port P1 of the second network distributor 130 as the input/output port of the second network distributor 130 through which the second network distributor 130 outputs a telegram after processing the telegram, provided that the telegram is enabled for processing, the enabling is indicated with the telegram element as described above, and the telegram further comprises the telegram identifier in the form of the segment address a of the first segment 300.

If the unblocked telegram for the first segment 300 is referred to below, the unblocked telegram always comprises the telegram identifier in the form of the segment address a and the telegram element indicating the release of the processing of the telegram for the corresponding network subscriber.

The sixth network subscriber 160 may read analogously addressed output data and insert input data into the unblocked telegram, and forward the unblocked telegram to the seventh network subscriber 165 via the eighth data line. The seventh network subscriber 165 also reads the output data addressed to it and inserts input data into the unblocked telegram accordingly. Furthermore, the seventh network subscriber 165 recognizes that subsequently downstream of it no further network subscriber is connected to the eighth data line 240. For example, for this purpose, an input/output port of the seventh network subscriber 165 may be short-circuited with a switch that the seventh network subscriber 165 may comprise, and the seventh network subscriber 165 may be set such that the seventh network subscriber 165 thereupon sends the unblocked telegram to the second network distributor 130 via the eighth data line 240. The second network distributor 130 may be set such that the second network distributor 130 then sends the unblocked telegram to the first network distributor 120 via the second data line 210. The first network distributor 120 may be configured such that the first network distributor 120 sends the unblocked telegram from the seventh network subscriber 165 back to the master subscriber 105 via the first data line 205.

The first network distributor 120 and the second network distributor 130 may each be configured as a network subscriber to process the telegram from the master subscriber 105. In addition to the above description, the first network distributor 120 may also be embodied to process the unblocked telegram in addition to the feature that the first network distributor 120 unlocks the blocked telegram sent from the master subscriber 105 by e.g. setting the second value of the data element of the telegram to the first value, or setting the second value of the EtherCAT protocol type to the first value, or adding the telegram element itself to the telegram. This applies to the third network distributor 140 to the same extent, because the third network distributor 140 may also be embodied as a network subscriber and be embodied to process unblocked telegrams.

Furthermore, the first to third network distributors 120, 130, 140 may be embodied as network distributors and use the telegram identifier for routing the telegram via the individual input/output ports of the first to third network distributors 120, 130, 140 that are allocated to the respective telegram identifier in the corresponding routing table of the first to third network distributors 120, 130, 140. In connection with the telegram identifier used for routing, the fourth segment 315 and/or connected third segment 310 connected to the fourth input/output port P3 and/or connected to the fifth input/output port P4 of the first network distributor 120 may in particular each form an independent segment, and not correspond to the segment in which the first network distributor 120 itself is arranged. Together with the master subscriber 105, the first network distributor 120 forms the sixth segment 325. Alternatively, the first network distributor 120 may also be part of the first segment 300.

In connection with the telegram identifier used for routing, the second segment 305 connected to the third input/output port P2 of the second network distributor 130 may in particular form an independent segment, and not correspond to the segment in which the second network distributor 130 itself is arranged. Furthermore, in connection with the telegram identifier used for routing, the fifth segment 320 connected to the fourth input/output port P3 of the third network distributor 140 may in particular form an independent segment, and not correspond to the segment in which the third network distributor 140 itself is arranged. For example, in the embodiment shown in FIG. 1, the second network distributor 130 and the third network distributor 140 are each part of the first segment 300 and the second segment 305, as the second input/output ports P1 may in each case be set for it.

In particular, the second input/output ports P1 of the second and third network distributors 130, 140 may each be set as permanently allocated input/output ports via which the corresponding network distributor 130, 140 outputs an unblocked telegram with the telegram identifier in the form of the segment address of the respective segment in which the second and third network distributors 130, 140 are arranged, by default without routing, that is, without a comparison to the input/output port stored in the routing table for the respective telegram identifier of the telegram. The first network distributor 120 is e.g. located in the sixth segment 325. In addition, the first network distributor 120 may also be part of the first segment 300, provided that the second input/output port P1 of the first network distributor 120 is set up according to the above explanation. Alternatively, it is also conceivable that the second network distributor 130 and the third network distributor 140 each form a separate segment. Furthermore, the first to third network distributors 120, 130, 140 may also be embodied in such a way that the first to third network distributors 120, 130, 140 are each not part of a segment, but individual segments may be connected to their input/output ports.

Upon receiving a blocked telegram having a telegram identifier and a telegram element in the form of a data element associated with a segment of the first network distributor 120, which segment may be, for example, a separate segment at an input/output port of the first network distributor 120, the first network distributor 120 may use the telegram identifier for routing the blocked telegram via the allocated input/output port of the first network distributor 120 stored in the routing table in the memory unit of the first network distributor 120. Prior thereto, the first network distributor 120 may release the blocked telegram to the network subscribers for processing by the first network distributor 120 setting the second value of the data element to the first value.

Also, the first network distributor 120 may set the second value of the EtherCAT protocol type to the first value if the telegram element is embodied as an EtherCAT protocol type. The first network distributor 120 may also use a blocked telegram with a telegram identifier that is not allocated any segment of the first network distributor 120, but is e.g. allocated to the first segment 300 in which the second network distributor 130 is located, to route the blocked telegram. For example, based on the stored allocation of the telegram identifier in the form of the segment address with the symbol b to the second segment 305 and via the input/output port to be routed in the process, the first network distributor 120 uses the second input/output port P1 of the first network distributor 120.

The first network distributor 120 passes the blocked telegram with the telegram identifier b, e.g. unchanged to the fifth network subscriber 155, via the second input/output port P1 of the first network distributor 120 over the second data line 210. The fifth network subscriber 155 reads a header section of the blocked telegram with the telegram identifier b when passing through, up to a telegram element, e.g. up to a data field that has the data element with the second value or up to a data field that comprises the EtherCAT protocol type with the second value. Also, the master subscriber 105 may identify the blocked telegram such that the blocked telegram does not have a telegram element and only an unblocked telegram comprises the telegram element.

Based on the second value of the data element or the EtherCAT protocol type, the fifth network subscriber 155 recognizes that the fifth network subscriber 155 is not intended to process the user data of the blocked telegram and sends the blocked telegram to the second network distributor 130 via the second data line 210. The second network distributor 130 receives the blocked telegram having the telegram identifier, the segment address b, via the first input/output port P0 and recognizes, on the basis of the telegram identifier and the stored allocation in the memory unit, that the input/output port of the second network distributor 130 allocated to the telegram identifier in the form of the segment address b and the input/output port of the second segment 305 for outputting the telegram is the third input/output port P2 of the second network distributor 130.

Prior to outputting the blocked telegram via the third input/output port P2, the second network distributor 130 unlocks the blocked telegram in which the second network distributor 130 sets the second value of the data element or the EtherCAT protocol type to the first value to indicate to the eighth network subscriber 170 upon outputting the unblocked telegram via the third input/output port P2 and the ninth data line 245 that processing of the telegram is enabled. Similarly, the second network distributor 130 may also be configured to indicate the release of the processing of the telegram by adding the telegram element to the telegram.

The eighth network subscriber 170 reads the output data of the telegram addressed to it, i.e., the user data, when passing through and puts its input data into the unblocked telegram before the eighth network subscriber 170 forwards the unblocked telegram to the third network distributor 140 via the ninth data line 245. The third network distributor 140 may be equally addressed by the unblocked telegram by the property that the third network distributor 140 may be formed as a network subscriber in the same way as the first and second network distributors 120, 130, when the second input/output port P1 is respectively set up as for outputting an unblocked telegram with the telegram identifier, the segment address of the respective segment in which the third network distributor 140 is arranged.

For example, the second input/output port P1 of the third network distributor 140 is permanently allocated for outputting the telegram with the telegram identifier, the segment address b, and the third network distributor 140 may accordingly operate as a network subscriber. In this case, the third network distributor 140 reads the output data addressed to it in the telegram when passing and puts its input data into the unblocked telegram before the third network distributor 140 outputs the unblocked telegram via the second input/output port P1 of the third network distributor 140 allocated to the telegram identifier of the second segment 305 via the tenth data line 250.

The ninth network subscriber 175 receives the unblocked telegram via the tenth data line 250, reads the output data of the telegram addressed to it, places its input data in the unblocked telegram, and sends the unblocked telegram to the tenth network subscriber 180 via the tenth data line 250. The tenth network subscriber 180, as well, reads the output data of the unblocked telegram addressed to it when passing and places its input data in the unblocked telegram. In addition, the tenth network subscriber 180 recognizes that it is the last network subscriber in the chain of network subscribers in the second segment 305. The tenth network subscriber 180 may e.g. also recognize this via a further input/output port of the tenth network subscriber 180 that is short-circuited with a switch, as explained above.

The tenth network subscriber 180 sends the unblocked telegram back to the ninth network subscriber 175 via the tenth data line 250, and the ninth network subscriber 175 sends the unblocked telegram to the second input/output port P1 of the third network distributor 140 via the tenth data line 250. The third network distributor 140 outputs the unblocked telegram to the eighth network subscriber 170 via the first input/output port P0 over the ninth data line 245, and the eighth network subscriber 170 sends the unblocked telegram to the second network distributor 130 via the ninth data line 245. The second network distributor 130 receives the unblocked telegram via the third input/output port P2.

For example, the second network distributor 130 may be set up such that when the second network distributor 130 receives an unblocked telegram from a preceding network distributor, such as the third network distributor 140, that is not intended for the first segment 300 allocated to the second network distributor 130 based on the telegram identifier, segment address b, the second network distributor 130 blocks the unblocked telegram, by the second network distributor 130 setting the first value of the data element or the EtherCAT protocol type to the second value or removes the telegram element of the telegram from the header section of the telegram, thereby preventing possible processing of the unblocked telegram on its way back to the master subscriber 105.

The third network distributor 130 outputs the blocked telegram via the first input/output port P0 to the fifth network subscriber 155 via the second data line 210. The fifth network subscriber 155 cannot process the blocked telegram and sends the blocked telegram to the first network distributor 120 via the second data line 210. The first network distributor 120 receives the blocked telegram on the second input/output port P1 and may e.g. be embodied to unlock the blocked telegram with the telegram identifier in the form of the segment address b, that is, to set the second value of the data element or the EtherCAT protocol type to the first value of the data element or the EtherCAT protocol type, before the first network distributor 120 outputs the telegram to the master subscriber 105 via the first input/output port P0 over the first data line 205.

The examples for explaining the telegram traffic from the master subscriber 105 to the network subscribers of the first and second segments 300, 305, or from the network subscribers in the two segments back to the master subscriber 105, have been chosen as examples and do not limit the telegram traffic to these examples. The explanation could equally have been provided for telegram traffic from the master subscriber 105 to another segment of the automation network 100.

An EtherCAT network generally comprises a data line network 200 with data lines, each of which has a forward line which is e.g. embodied as a TX line for sending the telegrams from the master subscriber 105 to the network subscribers, and a return line, which is e.g. embodied as an RX line for receiving the telegrams from the master subscriber 105 (TX: transmitter, RX: receiver). A network subscriber in an EtherCAT network is embodied to process an unblocked telegram on the forward line, i.e. to read the output data of the unblocked telegram addressed to the network subscriber and to put the input data of the network subscriber into the unblocked telegram. The telegrams are sent back in the EtherCAT network via the return line, wherein the network subscribers do not process the unblocked telegram via the return line.

For example, the second network distributor 130 may be set so that when the second network distributor 130 receives an unblocked telegram with the telegram identifier c via a forward line from a preceding network distributor, e.g. the first network distributor 120, the second network distributor 130 sends the unblocked telegram with the telegram identifier c back to the master subscriber 105 via the return line. In this case, the first data line 205 and the second data line 210 may each have a forward line and a return line, and the unblocked telegram may have been processed e.g. by the first network distributor 120 on the forward line. Processing of the unblocked telegram on the return line is then no longer provided.

The presetting of the second network distributor 130 may have been done using a configuration telegram sent by the master subscriber 105 to the second network distributor 130 prior to sending the telegrams. For example, the configuration telegram in the memory unit of the second network distributor 130 may be used to set that if the second network distributor 130 receives an unblocked telegram with a specific telegram identifier, e.g. in the form of the symbol c, via the forward line and the unblocked telegram has the first value of the data element or of the EtherCAT protocol type, the second network distributor 130 sends the unblocked telegram back to the master subscriber 105 via the return line.

Also, in the case of an available data line for sending and receiving telegrams in the second network distributor 130, the configuration telegram may be used to set that if the second network distributor 130 sends an unblocked telegram with a certain telegram identifier, for example in the form of the segment address b, which does not correspond to the segment that is allocated to the second network distributor 130, e.g. is not allocated to the first segment 300 with the telegram identifier a, but to the second segment 305, and the unblocked telegram has the first value of the data element or of the EtherCAT protocol type, the second network distributor 130 sets the first value of the data element or of the EtherCAT protocol type to the second value of the data element or of the EtherCAT protocol type in order to lock the telegram for processing by the network subscribers. This is particularly conceivable if processing of the telegram by the network subscribers on the return path of the telegram to the master subscriber 105 is not excluded. In this way, the confidentiality of the data transmission in the automation network 100 may thus be increased.

The second network distributor 130 has been selected as an example for the above explanation. However, this is not restricted to the features described, but any network distributor of the automation network 100 is equally suitable for this purpose.

The individual input/output ports of the network distributors on which the network distributors have each received a telegram from the master subscriber 105 may be stored by the respective network distributor in the memory unit or in the routing table of the network distributor in order to use the first input/output port P0 of the corresponding network distributor allocated to the master subscriber 105 as the output port when the telegrams are sent back from the respective network distributor.

Figure 2:
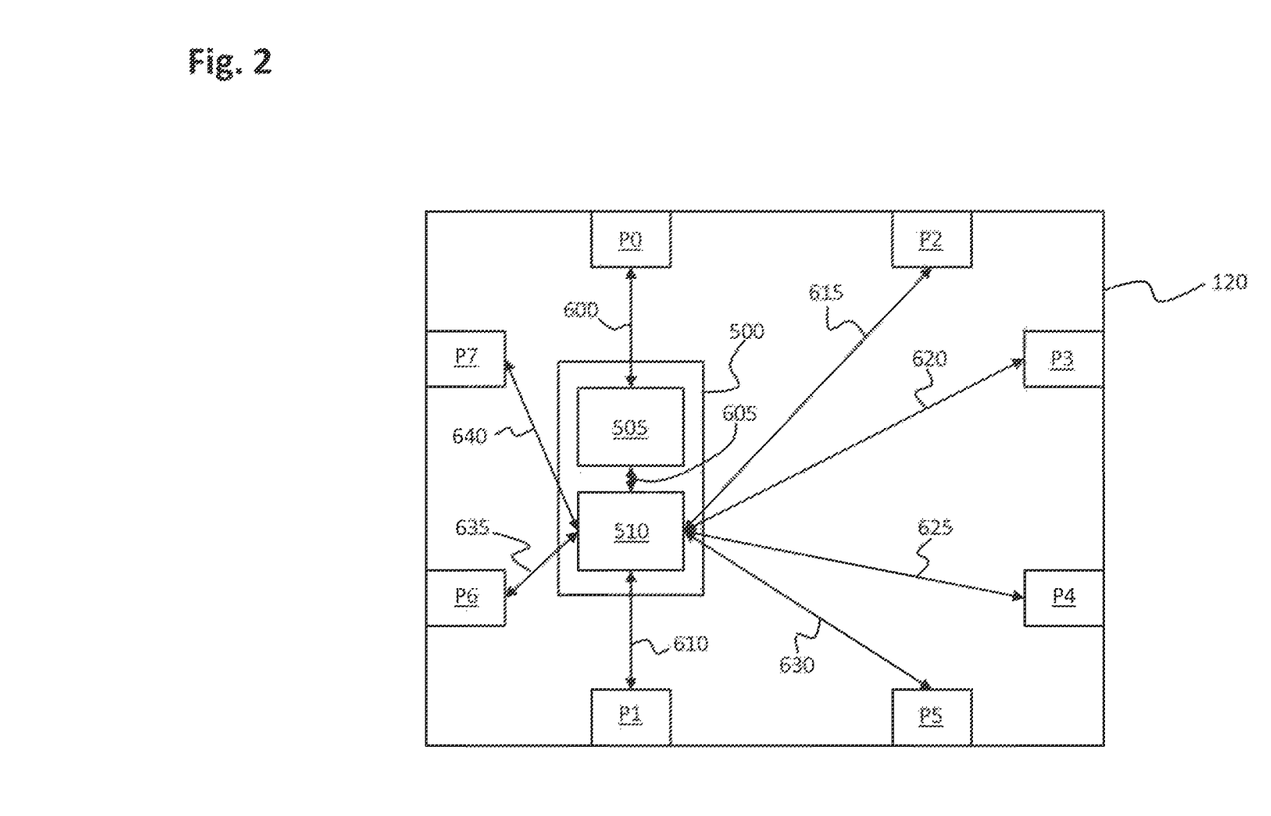
FIG. 2 shows a schematic diagram of a network distributor.

FIG. 2 shows a schematic structure of the first network distributor 120 of the automation network 100 shown in FIG. 1. For the explanation of the structure of a network distributor in the automation network 100 in FIG. 1, the first network distributor 120 has been selected as an example. However, the second and third network distributors 130, 140 may also be embodied in the same way as the first network distributor 120 and differ, for example, only in the number of input/output ports present in FIG. 1. Therefore, the following description of the first network distributor 120 is not to be understood as limiting the embodiment of the network distributors in the automation network 100 shown in FIG. 1.

The first network distributor 120 includes the first input/output port P0, via which the first network distributor 120 can receive a telegram from the master subscriber 105. The first input/output port P0 of the first network distributor 120 is in communication with a processing unit 500 by a first line of interaction 600. Here, the first line of interaction 600 as well as the lines of interaction described below represent possible internal physical and/or logical circuits or connections of the individual components within the first network distributor 120. Thus, the lines of interaction in FIG. 2 may illustrate simplified internal access of the components, but do not limit the implementation of the physical and/or logical circuit or connection to the representation shown.

Thus, the processing unit 500 of the first network distributor 120 may be addressed, i.e. set or generally addressed by telegrams from the master subscriber 105 via the first input/output port P0 of the first network distributor 120 and may be provided to process and/or route telegrams. As shown in FIG. 2, the processing unit 500 may comprise a protocol chip 505 and a routing unit 510, which are e.g. interconnected via a second line of interaction 605. Thus, the processing unit 500 may be embodied as hardware, as shown in FIG. 2. Alternatively, an embodiment of the processing unit 500 by software is also conceivable, as well as a combined hardware and software implementation of the processing unit 500.

With the protocol chip 505, which in an EtherCAT network is preferably embodied as an EtherCAT slave controller, processing of an unblocked telegram from the master subscriber 105, which indicates the enabling of processing by the telegram element and in the EtherCAT network in particular by the first value of the EtherCAT protocol type, may be performed by the first network distributor 120. Accordingly, the first network distributor 120 becomes a full-fledged network subscriber 800 embodied as a slave subscriber by using the protocol chip 505 embodied to process a specific data transmission protocol. Consequently, in an EtherCAT network the first network distributor 120 may function as an ordinary EtherCAT slave subscriber by using an EtherCAT slave controller as the protocol chip 505 and may process an unblocked telegram received from the master subscriber 105 via the first input/output port P0 of the first network distributor 120 on the fly. Accordingly, the protocol chip 505 of the first network distributor 120 is addressed via the first input/output port P0 of the first network distributor 120.

The processing unit 500 of the first network distributor 120 may additionally comprise a memory unit with a routing table. In the case of a protocol chip 505 embodied as an EtherCAT slave controller, e.g. the memory unit with the routing table, may be included in the EtherCAT slave controller. However, the first network distributor 120 not only has the functionality of a network subscriber configured as a slave subscriber for processing unblocked telegrams, but may also route blocked telegrams with the functionality of a network distributor via the input/output port of the first network distributor 120 allocated to the corresponding telegram identifier. For routing the blocked telegrams, the first network distributor 120 may use the routing unit 510 of the processing unit 500. In FIG. 2, the protocol chip 505 and the routing unit 510 of the processing unit 500 are depicted as separate entities in order to be able to separate the individual functionalities. However, this is not mandatory for the implementation of the first network distributor 120 and may also be realized differently, e.g. in the form of a shared unit.

Thus, the idea is to provide a device with dual functionality, i.e. to combine a configurable network distributor, a "switch" or "branch" with a conventional network or slave subscriber capable of processing telegrams from a master subscriber, and to indicate to the combined device with dual functionality, by suitable indication in the telegrams sent by the master subscriber, the release of the processing or the blocking of the processing of the telegram.

For routing a blocked telegram, which has not been processed before by the protocol chip 505 of the first network distributor 120, via an input/output port of the first network distributor 120, the routing unit 510 may access the memory unit of the protocol chip 505, which is embodied as an EtherCAT slave controller in the EtherCAT network, by the second line of interaction 605 in order to be able to read out the routing table of the memory unit. In the routing table of the memory unit, the allocation of the individual input/output ports of the first network distributor 120 to a telegram identifier of a telegram from the master subscriber 105 may be stored.

It may also have been stored in the routing table e.g. by the master subscriber 105 that a blocked telegram with the second value of the data element or the EtherCAT protocol type or, respectively, no displayed telegram element and a specific telegram identifier is unblocked by the first network distributor 120 before being output via the input/output port of the first network distributor 120 allocated to the specific telegram identifier, in order to indicate to the network subscribers connected to the corresponding input/output port that processing of the telegram is enabled. For this purpose, it may be set in the routing table that the routing unit 510 of the first network distributor 120 sets the second value of the data element or EtherCAT protocol type to the first value of the data element or EtherCAT protocol type.

Furthermore, the routing table may have an entry on the input/output ports present at the first network distributor 120 to which network subscribers are connected via data lines, as well as on a status of the lines of interaction between the components in the first network distributor 120, i.e. for example, whether the connections are short-circuited by a switch function, i.e. deactivated or not enabled, or whether they are set to active. The data transmission rate for which the connected network subscribers are embodied may also be entered as a further entry in the routing table. Likewise, as explained above, the routing table may comprise an entry for the routing unit 510, i.e. via which input/output port a telegram with a particular telegram identifier is to be routed and whether, if applicable, the telegram is to be enabled for processing. In this context, it is conceivable that the routing table contains an entry in which the input/output port of the first network distributor 120 is stored, via which the first network distributor 120 received a telegram from the master subscriber, in order to be able to output the telegram again on the way back to the master subscriber via the same input/output port. In the embodiment shown in FIG. 2, this is e.g. the first input/output port P0 of the first network distributor 120. The routing table does not necessarily have to be implemented in the form of a table, but may also form a register set of the memory unit.

For example, a telegram blocked for processing with a telegram identifier in the form of the segment address d, by which the third segment 310 comprising the second, third and fourth network subscribers 125, 135, 145 may be addressed, may be received by the routing unit 510 of the first network distributor 120 based on the allocation of the telegram identifier, the segment address d, may be read out from the routing table of the memory unit of the protocol chip 505 embodied as an EtherCAT slave controller to the fifth input/output port P4 of the first network distributor 120 via the second line of interaction 605. Moreover, the routing unit 510 may release the telegram with the telegram identifier of the segment address d for the network subscribers of the third segment 310 for processing in that the routing unit 510 of the first network distributor 120 sets the second value of the data element or of the EtherCAT protocol type to the first value of the data element or the EtherCAT protocol type, respectively, and outputs the unblocked telegram via a sixth line of interaction 625 to the second, third and fourth network subscribers 125, 135, 145 for processing via the fifth input/output port P4 of the first network distributor 120.

Furthermore, a telegram with the telegram identifier in the form of the segment address e, which is used to address the first network subscriber 115 in the fourth segment 315 and which is blocked for processing, may be allocated to the fourth input/output port P3 of the first network distributor 120 in the routing table of the protocol chip 505 configured as an EtherCAT slave controller. Analogously to the above description, the routing unit 510 may be embodied to set the second value of the data element or the EtherCAT protocol type to the first value in order to release the telegram with the telegram identifier, the segment address e, for processing for the first network subscriber 115. The routing unit 510 accesses the routing table of the protocol chip 505 for routing the telegram with the telegram identifier in the form of the segment address e, releases the telegram for processing and sends the telegram to the first network subscriber 115 via a fifth line of interaction 520 through the fourth input/output port P3.

In the same manner as explained above, the routing unit 510 may output telegrams via a fourth line of interaction 615 via the third input/output port P2 to the further master subscriber 110, output telegrams via an eighth line of interaction 635 via the seventh input/output port P6 to the thirteenth network subscriber 405, and output telegrams via a ninth line of interaction 640 via the eighth input/output port P7 to the twelfth network subscriber 400. Prior to outputting the individual telegrams, the routing unit 510 may release the telegrams to each of the network subscribers for processing, as described above. For example, in the automation network 100 shown in FIG. 1, the first network distributor 120 does not have a data line with network subscribers at the sixth input/output port P5. Accordingly, a seventh line of interaction 630 in FIG. 2 that forms a connection between the routing unit 510 and the sixth input/output port P5 of the first network distributor 120 may be disabled. This may e.g. be done automatically by the first network distributor 120 or by the master subscriber 105.

The second input/output port P1 of the first network distributor 120 may be embodied as a specified input/output port through which the first network distributor 120 outputs an unblocked telegram previously processed by the protocol chip 505 by default. For example, the determination may be stored by the master subscriber 105 in the memory unit of the protocol chip 505, so that the routing unit 510 does not need to access the routing table via the second line of interaction 605 in this case. If the protocol chip 505 is embodied as an EtherCAT slave controller, the EtherCAT slave controller is arranged between two distinguished input/output ports of the first network distributor 120, the first input/output port P0 e.g. forming the first distinguished input/output port and the second input/output port P1, which is formed as a permanent input/output port, forming the second distinguished input/output port of the first network distributor 120. For an automatic configuration of the automation network 100, which is preferably embodied as an EtherCAT network, it may be necessary that only EtherCAT network subscribers, which are embodied for the second data transmission rate with at least 1 Gbit/s, are connected to the first and the second distinguished input/output port of the first network distributor 120.

However, the first network distributor 120 may equally route telegrams via the second input/output port P1. In particular, the routing unit 510 of the first network distributor 120 may route a blocked telegram with the telegram identifier, the segment address c, by which the network subscribers of the second segment 305 may be addressed, via the second input/output port P1. This is because the routing table of the protocol chip 505 e.g. stores that the telegram identifier in the form of the segment address c is allocated to the second input/output port P1 for the output of the telegram. Since the network subscribers of the second segment 305 are directly connected to the third network distributor 130 via the ninth data line 245, the routing table of the first network distributor 120 may e.g. not include an entry that the routing unit 610 of the first network distributor 120 sets the second value of the data element or the EtherCAT protocol type to the first value to enable the telegram for processing. This is because the telegram, after being output by the routing unit 510 via the second input/output port P1, first passes through the fifth network subscriber 155 before the third network distributor 130 receives the telegram via its first input/output port P0. Blocking the telegram for processing is therefore useful if the fifth network subscriber 155 is not to process the telegram on its way to the second segment 305.

Moreover, the first network distributor 120 as well as the second and third network distributors 130, 140 are embodied to fragment telegrams from the network subscribers on their way back to the master subscriber 105 and to transmit the telegrams in fragments over the data line network 200 to the master subscriber 105.

In the course of acquiring the automation network 100 with its network subscribers, the first network distributor 120 may send a query telegram received from the master subscriber 105 via the first input/output port P0 back to the master subscriber 105 via the first data line 205, e.g. after reading out the protocol chip 505, i.e. more precisely the register set of the memory unit, which may comprise the routing table of the first network distributor 120. This is done because the second line of interaction 605 between the protocol chip 505 and the routing unit 610 is initially disabled, i.e., no connection between the protocol chip 505 and the routing unit 610 is enabled yet. However, the register set is independently readable in order to obtain information on the existing input/output ports of the first network distributor 120 as well as on the possibility of adjusting the data transmission rate and to be able to recognize the first network distributor 120 as such from the master subscriber 105 based on said information. The connection, i.e. the second line of interaction 605, as well as further lines of interaction may then be enabled. This may e.g. be done by overwriting an entry provided for this purpose in the register set in the memory unit of the protocol chip 505 for the status of the connection from the master subscriber 105.

The first network distributor 120 as well as the second and third network distributors 130, 140 are not limited to the network topology shown in FIG. 1, but may also be used in networks with different network topologies. Furthermore, they are not limited to an EtherCAT network, but may also be used in other networks in which network distributors are required for routing the telegrams and the network distributors are also to be used for processing the telegrams.

The invention has been described in detail by preferred embodiment examples. Instead of the described examples of embodiment, further examples of embodiment are conceivable which may have further variations or combinations of described features. For this reason, the invention is not limited by the disclosed examples, since other variations may be derived therefrom by those skilled in the art without departing from the scope of protection of the invention.

TABLE 1

List of reference numerals 100 automation network
105 master subscriber
110 further master subscriber
115 first network subscriber
120 first network distributor
125 second network subscriber
130 second network distributor
135 third network subscriber
140 third network distributor
145 fourth network subscriber
155 fifth network subscriber
160 sixth network subscriber
165 seventh network subscriber
170 eighth network subscriber
175 ninth network member
180 tenth network subscriber
185 eleventh network subscriber
200 data line network
205 first data line
210 second data line
215 third data line
220 fourth data line
225 fifth data line
230 sixth data line TABLE 1-continued List of reference numerals 235 seventh data line
240 eighth data line
245 ninth data line
250 tenth data line
255 eleventh data line
260 twelfth data line
300 first segment
305 second segment
310 third segment
315 fourth segment
320 fifth segment
325 sixth segment
400 twelfth network subscriber
405 thirteenth network subscriber
410 fourteenth network subscriber
500 processing unit
505 protocol chip
510 routing unit
600 first line of interaction
605 second line of interaction
610 third line of interaction
615 fourth line of interaction
620 fifth line of interaction
625 sixth line of interaction
630 seventh line of interaction
635 eighth line of interaction
640 ninth line of interaction
800 network subscribers
P0 first input/output port
P1 second input/output port
P2 third input/output port
P3 fourth input/output port
P4 fifth input/output port
P5 sixth input/output port
P6 seventh input/output port
P7 eighth input/output port

The invention claimed is:

1. An automation network comprising:
network subscribers that are interconnected via data lines,
wherein at least one of the network subscribers is configured as a master subscriber configured to send telegrams over the data lines,
wherein at least one of the network subscribers is configured as a network distributor configured to route the telegrams,
wherein the network distributor comprises a plurality of input/output ports and is connected via a first of the input/output ports to the master subscriber via the data lines,
wherein the master subscriber is configured to indicate with a telegram element in a telegram to be sent that the telegram is enabled for processing by the network subscribers, and
wherein the network distributor is configured to process a telegram received via the first input/output port when the telegram element of the telegram indicates an enablement of processing of the telegram for the network subscribers.

2. The automation network according to claim 1, wherein the network distributor is configured, if the network distributor receives a telegram from the master subscriber via the first input/output port, which telegram indicates release of the processing of the telegram for the network subscribers by the telegram element, to output the telegram after the processing by the network distributor via a permanently allocated further input/output port of the network distributor, if further network subscribers are connected to the permanently allocated further input/output port of the network distributor.

3. The automation network according to claim 1, wherein, if a telegram does not indicate an enablement of processing of the telegram by the network subscribers and the network distributor determines upon routing the telegram that the telegram is intended for network subscribers directly connected via an input/output port of the network distributor, the network distributor is configured to release the telegram for processing by the network subscribers and to indicate the release of the processing by the telegram element.

4. The automation network according to claim 1,
wherein the telegrams have a telegram identifier, and
wherein the network distributor is configured to perform routing of the telegrams via the input/output ports of the network distributor based on the telegram identifier.

5. The automation network according to claim 1,
wherein the telegram element is formed as a data element with a first or second value,
wherein the first value indicates that the telegram is enabled for processing by the network subscribers, and
wherein the second value indicates that the telegram is blocked for processing by the network subscribers.

6. The automation network according to claim 1, wherein the telegrams are EtherCAT telegrams, and wherein the telegram element is configured as an EtherCAT protocol type.

7. A network distributor comprising:
a plurality of input/output ports and a processing unit for processing and/or routing a telegram,
wherein the network distributor is configured to be connected to a master subscriber via a first of the input/output ports over data lines, and
wherein the processing unit of the network distributor is configured to process a telegram received via the first input/output port of the network distributor from the master subscriber if the master subscriber indicates by a telegram element in the telegram that the telegram is enabled for processing by the processing unit of the network distributor.

8. The network distributor according to claim 7,
wherein the processing unit of the network distributor is connected to the first input/output port of the network distributor, and
wherein the processing unit of the network distributor is configured, if the network distributor receives a telegram from the master subscriber via the first input/output port, to indicate by the telegram element an enabling of the processing of the telegram for the processing unit of the network distributor, and for outputting the telegram after processing by the network distributor via a permanently allocated further input/output port of the network distributor, if further network subscribers are connected to the permanently allocated further input/output port of the network distributor.

9. The network distributor according to claim 7, wherein, if a telegram does not indicate an enabling of processing of the telegram by the network subscribers, and the network distributor determines by the processing unit when routing the telegram that the telegram is intended for network subscribers directly connected via an input/output port of the network distributor, the processing unit of the network distributor is configured to release the telegram for processing by the network subscribers and to indicate the release of the processing with the telegram element.

10. The network distributor according to claim 7,
wherein the telegrams have a telegram identifier, and
wherein the processing unit of the network distributor comprises a protocol chip for processing the telegrams and has a routing unit to perform routing of the telegrams via the input/output ports of the network distributor on the basis of the telegram identifier of the telegrams.

11. The network distributor according to claim 10, wherein the protocol chip of the processing unit of the network distributor is configured as an EtherCAT slave controller.

12. The network distributor according to claim 10,
wherein the routing unit of the processing unit of the network distributor is configured to compare the telegram identifier of the telegrams in each case with a routing table and to output the telegrams via an input/output port of the network distributor allocated to the telegram identifier, and
wherein the routing unit of the processing unit of the network distributor is configured to release a telegram for processing by the network subscribers and to indicate the release to the network subscribers in the telegram with the telegram element.

13. The network distributor according to claim 7,
wherein the telegram element is formed as a data element with a first or second value,
wherein the first value indicates that a telegram is enabled for processing by the network subscribers, and
wherein the second value indicates that a telegram is blocked for processing by the network subscribers.

14. The network distributor according to claim 7,
wherein the telegrams are configured as EtherCAT telegrams and the network distributor is configured to process the EtherCAT telegrams, and
wherein the telegram element is configured as an EtherCAT protocol type.

15. A method for transmitting data in an automation network,
wherein the automation network comprises network subscribers, wherein at least one of the network subscribers is configured as a master subscriber configured to send telegrams,
wherein at least one of the network subscribers is configured as a network distributor configured to route the telegrams,
wherein with a telegram element in a telegram to be sent it is indicated that the telegram is enabled for processing by the network subscribers, and
wherein the network distributor is configured to process a telegram received via a first input/output port when the telegram element of the telegram indicates an enablement of processing of the telegram for the network subscribers.

16. The method according to claim 15, wherein for processing and/or routing a telegram a processing unit is used.

17. The method according to claim 15, wherein, if the network distributor receives a telegram from the master subscriber via the first input/output port, which telegram indicates a release of the processing of the telegram for the network subscribers by the telegram element, the telegram is output after the processing by the network distributor via a permanently allocated further input/output port of the network distributor, if further network subscribers are connected to the permanently allocated further input/output port of the network distributor.

18. The method according to claim 15, wherein, if a telegram does not indicate an enabling of processing of the telegram by the network subscribers and the network distributor determines upon routing the telegram that the telegram is intended for network subscribers directly connected via an input/output port of the network distributor, the telegram is released for processing by the network subscribers and to indicate the release of the processing by the telegram element.

19. The method according to claim 15,
wherein the telegrams have a telegram identifier, and
wherein routing of the telegrams via the input/output ports of the network distributor is performed based on the telegram identifier.

20. The method according to claim 15,
wherein the telegram element is formed as a data element with a first or second value,
wherein the first value indicates that a telegram is enabled for processing by the network subscribers,
wherein the second value indicates that a telegram is blocked for processing by the network subscribers, and
wherein the telegrams are EtherCAT telegrams, wherein the telegram element is configured as an EtherCAT protocol type.

* * * * *